United States Patent Office 3,073,798
Patented Jan. 15, 1963

3,073,798
GRAFT COPOLYMERS AND POLYMER BLENDS CONTAINING SAME
Massimo Baer, Longmeadow, Mass., assignor to Monsanto Chemical Company, St. Louis, Mo., a corporation of Delaware
No Drawing. Filed Nov. 9, 1959, Ser. No. 851,556
7 Claims. (Cl. 260—45.5)

This invention relates to graft copolymers that are prepared by polymerizing a monomer mixture consisting of styrene and acrylonitrile in an aqueous dispersion of a highly cross-linked rubbery interpolymer of butadiene and styrene. The invention further relates to blends of such graft copolymers with interpolymers of styrene and acrylonitrile.

Graft copolymers that are prepared by polymerizing mixtures of syrene and acrylonitrile monomers in aqueous dispersions of rubbery diene polymers, including certain butadiene-styrene interpolymers, are known. See British patent 649,166. Blends of such graft copolymers with interpolymers of styrene and acrylonitrile also are known. See U.S. 2,820,773. The known graft copolymers of this type and polymer blends containing such graft copolymers suffer from two well-recognized deficiencies. The first of these deficiencies is that the graft copolymers and the polymer blends containing same are translucent to opaque, whereas transparent polymers are required in many applications, e.g., as in the packaging arts. The second deficiency of the known graft copolymers and polymer blends containing same is that the surfaces of articles fabricated therefrom are often both dull and rough, whereas in most instances it is desirable that the fabricated articles have smooth and glossy surfaces.

It is an object of this invention to provide novel graft copolymers that are prepared by polymerizing styrene-acrylonitrile monomer mixtures in aqueous dispersions of certain particular rubbery diene polymers, which graft copolymers are substantially transparent and which, when fabricated, have substantially smooth and glossy surfaces.

Another object of this invention is to provide blends of styrene-acrylonitrile interpolymers with graft copolymers of the type described in the paragraph above, which blends are substantially transparent and which, when fabricated, have substantially smooth and glossy surfaces.

Other objects and advantages of this invention will become apparent from the following detailed description thereof.

It has been discovered that certain styrene-acrylonitrile/butadiene-styrene graft copolymers, when prepared by the particular process subsequently set forth, are transparent and have smooth and glossy surfaces when fabricated by conventional techniques, e.g., injection molding. In the subsequent description of the invention, these polymers will sometimes be referred to as styrene-acrylonitrile graft copolymers or simply as graft copolymers. Such graft copolymers are prepared by polymerizing 10–900 parts of a mixture of styrene and acrylonitrile monomers in an aqueous dispersion of 100 parts of a highly cross-linked butadiene-styrene interpolymer. The styrene-acrylonitrile monomer mixture must contain 60–90 weight percent of styrene and, correspondingly, 40–10 weight percent of acrylonitrile. The butadiene-styrene interpolymer must contain 40–75 weight percent of butadiene and, correspondingly, 60–25 weight percent of styrene and must be sufficiently highly cross-linked to have a swelling index in benzene of not greater than about 25. The precise meaning and procedure for determining the swelling index are subsequently described.

The invention further relates to blends of a graft copolymer of the above type with an interpolymer of 60–90 weight percent of styrene and, correspondingly, 40–10 weight percent of acrylonitrile. The graft copolymer and the interpolymer are included in the polymer blend in such proportions that the butadiene-styrene interpolymer employed as the substrate in the preparation of the graft copolymer will constitute about 5–40 weight percent of the polymer blend.

The following examples are set forth to illustrate more clearly the principle and practice of this invention to those skilled in the art. All parts are by weight.

The following polymers are prepared for employment in the subsequently described examples.

BUTADIENE-STYRENE INTERPOLYMER A

A latex of butadiene-styrene interpolymer A is prepared employing the polymerization recipe set forth below.

| Component: | Parts |
|---|---|
| Water | 200 |
| Butadiene | 70 |
| Styrene | 30 |
| Divinyl benzene | 1 |
| Sodium stearate | 5 |
| Potassium persulfate | 0.3 |
| Dodecyl mercaptan | 0.3 |

The water and soap are charged to a pressure-resistant stirred autoclave. The resulting soap solution is boiled to remove dissolved oxygen and then cooled under nitrogen. The remaining components of the polymerization system are then added and the autoclave is sealed. The polymerization is effected by heating the reaction mixture to 50° C. for 48 hours. The conversion of monomers to polymer is 98%.

A sample of the butadiene-styrene interpolymer is recovered from the latex and has a swelling index (in benzene) of about 12 as determined by the test procedure described in the paragraph below.

Throughout the specification and in the appended claims the term swelling index is employed in the sense set forth in the first full paragraph of page 338 of the text "Synthetic Rubber" by G. S. Whitby, John Wiley & Sons Inc., New York City, 1954. Specifically, the swelling index of a rubber is defined as the ratio of the weight of the solvent swollen gel (the gel being the portion of the rubber that is insoluble in the solvent) to the weight of the dry gel. To determine the value of the swelling index, 0.3 gram of the butadiene-styrene interpolymer is placed in 75 ml. of benzene and maintained in total darkness for 24 hours at 20° C. The resulting mixture is filtered through a tared 100 mesh (U.S. standard) stainless steel screen and the weight of the insoluble solvent swollen polymer is determined after washing the insoluble polymer with 10 ml. of benzene. An aliquot of the filtrate is evaporated to dryness to determine the weight of the butadiene-styrene interpolymer that is soluble in the benzene. The swelling index is then calculated in accordance with the equation:

$$\text{Swelling index} = \frac{\text{Wt. in grams of solvent swollen polymer}}{0.3 - \text{wt. in grams of benzene soluble polymer}}$$

BUTADIENE-STYRENE INTERPOLYMER B

A latex of butadiene-styrene interpolymer B is prepared from a monomer mixture consisting of 50 parts of butadiene, 50 parts of styrene and no divinyl benzene. The balance of the polymerization recipe and the process employed are identical with that described with respect to the preparation of butadiene-styrene interpolymer A. A sample of the butadiene-styrene interpolymer is recovered from the latex and has a swelling index of about 25.

BUTADIENE-STYRENE INTERPOLYMER C

A latex of butadiene-styrene interpolymer C is prepared in the same manner as butadiene-styrene interpolymer A except that the monomers charged to the polymerization recipe consist of 50 parts of butadiene, 50 parts of styrene and 1 part of divinyl benzene. A sample of the butadiene-styrene interpolymer is recovered from the latex and has a swelling index of about 11.

BUTADIENE-DIVINYL BENZENE INTERPOLYMER

A latex of a control butadiene-divinyl benzene interpolymer is prepared in the same manner as the butadiene-styrene interpolymers previously described except that the monomers charged to the polymerization consists of 100 parts of butadiene and 1 part of divinyl benzene. A sample of the butadiene-divinyl benzene interpolymer is recovered from the latex and has a swelling index of about 12.

STYRENE-ACRYLONITRILE GRAFT COPOLYMER A

The latex of butadiene-styrene interpolymer A is diluted with oxygen-free water to 10 weight percent rubber solids and 1,000 parts of the diluted latex are charged to an autoclave fitted with a reflux condenser. Two additional solutions are prepared; the first of which consists of 181 parts of a monomer solution containing 68 weight percent of styrene monomer and 32 weight percent of acrylonitrile, said monomer solution also containing 0.6 weight percent (based on total monomers) of dodecyl mercaptan, and the second of which consists of potassium persulfate in the amount of 0.2 weight percent of the monomer solution dissolved in 70 parts of oxygen-free water. The diluted latex of butadiene-styrene interpolymer A is heated to gentle reflux and the catalyst solution and the styrene-acrylonitrile monomer solution are added in separate streams to the refluxing latex at a steady rate over a period of 90 minutes. Refluxing is continued until the styrene and acrylonitrile monomers are completely polymerized. The resulting emulsion is cooled to room temperature under a nitrogen atmosphere and 2 parts of a styrenated phenol anti-oxidant are added thereto.

STYRENE-ACRYLONITRILE GRAFT COPOLYMER B

Styrene-acrylonitrile graft copolymer B is prepared in precisely the same manner as styrene-acrylonitrile graft copolymer A except that the styrene and acrylonitrile monomers are polymerized in the presence of butadiene-styrene interpolymer B in lieu of the butadiene-styrene interpolymer A.

STYRENE-ACRYLONITRILE GRAFT COPOLYMER C

The latex of butadiene-styrene interpolymer C is diluted to 10 weight percent rubber solids with oxygen-free water and 1,000 parts of the diluted latex are charged to an autoclave fitted with a reflux condenser. Two additional solutions are prepared; the first of which consists of 116 parts of a monomer mixture containing 68 weight percent of styrene and 32 weight percent of acrylonitrile, said monomer solution also containing 0.6 weight percent of dodecyl mercaptan based on the monomers, and the second of which consists of potassium persulfate in the amount of 0.2 weight percent of the monomer solution dissolved in 35 parts of oxygen-free water. The diluted butadiene-styrene interpolymer latex is heated to gentle reflux and the monomer solution and catalyst solution are added thereto in separate streams at a steady rate over a period of 90 minutes. Gentle reflux is continued until the polymerization of the styrene and acrylonitrile monomers is complete. The resulting emulsion is cooled at room temperature under a nitrogen atmosphere and 2 parts of a styrenated phenol anti-oxidant are added thereto.

STYRENE-ACRYLONITRILE GRAFT COPOLYMER D

Styrene-acrylonitrile graft copolymer D is prepared in the same manner as styrene-acrylonitrile graft copolymer C except that the quantity of styrene-acrylonitrile monomer mixture employed in the reaction is increased from 116 parts to 181 parts.

STYRENE-ACRYLONITRILE GRAFT COPOLYMER E

Styrene-acrylotnitrile graft copolymer E is prepared in the same manner as styrene-acrylonitrile graft copolymer C except that the quantity of styrene-acrylonitrile monomer mixture employed in the reaction is increased from 116 parts to 258 parts.

STYRENE-ACRYLONITRILE GRAFT COPOLYMER F

Styrene-acrylonitrile graft copolymer F is prepared in precisely the same manner as styrene-acrylonitrile graft copolymer A, except that the styrene and acrylonitrile monomers are polymerized in the presence of the butadiene-divinyl benzene interpolymer in lieu of butadiene-styrene interpolymer A.

STYRENE-ACRYLONITRILE INTERPOLYMER

Two hundred and fifty parts of water containing 0.7 part of sodium stearate are charged to an autoclave fitted with a reflux condenser. Two additional solutions are prepared; the first of which consists of 0.2 part potassium persulfate dissolved in 25 parts of water and the second of which consists of 68 parts of styrene monomer, 32 parts of acrylonitrile monomer and 0.6 part of dodecyl mercaptan. After refluxing the soap solution to remove dissolved oxygen, the catalyst solution and the styrene-acrylonitrile monomer solution are added in separate streams to the refluxing soap solution at a steady rate over a period of 1 hour, at the end of which time the polymerization is complete.

Examples I–V

Four polymer blends are prepared by admixing the latexes of styrene-acrylonitrile graft copolymers A, B, C and D with the latex of the styrene-acrylonitrile interpolymer. In each instance, the weights of the two latexes so combined are selected so that 28% of the total polymer solids is the butadiene-styrene interpolymer employed as the substrate in the preparation of the styrene-acrylonitrile graft copolymer. The polymer blends are recovered from the mixed latexes by drum-drying. The latex of styrene-acrylonitrile graft copolymer E is also drum-dried to recover a graft copolymer in which the butadiene-styrene interpolymer substrate constitute 28 weight percent of the graft copolymer. Details as to the particular styrene-acrylonitrile graft copolymer employed in preparing each of the polymer blends and the relative proportions of graft copolymer and the styrene-acrylonitrile interpolymer employed in the preparation thereof are set forth in Table I.

TABLE I

| Example | S-AN[1] graft copolymer employed | Parts S-AN[1] graft copolymer employed, solids basis | Parts S-AN[1] interpolymer employed, solids basis | Weight percent BD-S[2] interpolymer in final polymer blend, solids basis |
|---|---|---|---|---|
| I | "A" | 281 | 77 | 23 |
| II | "B" | 281 | 77 | 23 |
| III | "C" | 216 | 142 | 28 |
| IV | "D" | 281 | 77 | 28 |
| V | "E" | 358 | 0 | 23 |

[1] S-AN = Styrene-acrylonitrile.
[2] BD-S = Butadiene-styrene.

Two polymer blends falling outside the scope of this invention are prepared as controls to be employed in comparing the optical and physical properties of the polymer blends of this invention.

Control A is prepared by admixing 72 parts (polymer solids) of the previously described latex of the styrene-acrylonitrile interpolymer, 28 parts (rubber solids) of the latex of butadiene-styene interpolymer A, and 0.6 part of a styrenated phenol anti-oxidant and recovering the polymer blend from the mixed latexes by drum-drying.

Control B is prepared by admixing 281 parts (polymer solids) of the latex of styrene-acrylonitrile graft copolymer F with 77 parts (polymer solids) of the previously described latex of the styrene-acrylonitrile interpolymer and recovering the polymer blend from the mixed latexes by drum-drying.

Control A and control B both contain 28 weight percent of a rubbery polymer.

Each of the above prepared polymer compositions, i.e., Examples I-V and controls A and B, is milled for approximately 10 minutes on a 2-roll rubber mill with the front roll temperature being set at 340° F. and the back roll temperature being set at 150° F. The milled polymers are then ground to a fine powder. One portion of each of the powders is compression molded at 340° F. to prepare a polymer sheet 0.060 inch thick. The specimens molded from the polymer blends of Examples I-V are smooth and glossy, whereas the specimens molded from controls A and B are dull and rough.

A second portion of each of the finely ground polymer powders prepared in the paragraph above is further worked by being injection molded at 400° F. The injection molded pieces are then ground to a fine powder and compression molded at 340° F. into sheets 0.060 inch thick. The specimens prepared from the polymer blends of Examples I-V are appreciably smoother and glossier than the specimens prepared from controls A and B.

The clarity of each of the 0.060 inch sheets prepared in the two paragraphs above is evaluated by ASTM test procedure D-1003-52. In this test the total transmittance ($T_t$) and diffuse transmittance ($T_d$) of the plastic sheets are measured at 550 millimicrons and the haze or translucence of the polymer sheets is calculated in accordance with the equation:

$$\text{Haze} = \frac{T_d \times 100}{T_t}$$

The test results are set forth in Table II.

TABLE II

| Polymer composition evaluated | Optical properties of mill rolled samples | | | Optical properties of injection molded samples | | |
|---|---|---|---|---|---|---|
| | $T_t$[1] | $T_d$[2] | Haze,[3] percent | $T_t$[1] | $T_d$[2] | Haze,[3] percent |
| Example I | 67 | 17 | 25 | 44 | 27 | 61 |
| Example II | 74 | 12 | 16 | 56 | 21 | 38 |
| Example III | 79 | 12 | 15 | 58 | 22 | 38 |
| Example IV | 75 | 7 | 9 | 57 | 18 | 32 |
| Example V | 82 | 6 | 7 | 66 | 14 | 21 |
| Control A | 49 | 48 | 98 | 37 | 36 | 98 |
| Control B | 35 | 28 | 80 | 31 | 30 | 97 |

[1] $T_t$ = Total transmittance.
[2] $T_d$ = Diffuse transmittance.
[3] Haze = $\frac{T_d \times 100}{T_t}$ Examination of the above table shows that the haze values of the polymer compositions prepared in Examples I-V are materially less than the haze values obtained with either of the control compositions.

Comparison of the haze values of the polymer blends of Examples I and IV, which differ from each other only in the composition of the butadiene-styrene interpolymer substrate of their graft copolymer component, emphasizes the importance of the proportions of butadiene and styrene contained in the rubbery substrate of the graft copolymer. The polymer blend of Example IV, in which the rubbery substrate of the graft copolymer component is a butadiene-styrene interpolymer containing 50 parts of butadiene, 50 parts of styrene and 1 part of divinyl benzene, has a materially smaller haze value than the polymer blend of Example I in which the rubbery substrate of the graft copolymer component is a butadiene-styrene interpolymer containing 70 parts of butadiene, 30 parts of styrene and 1 part of divinyl benzene.

Comparison of the haze values of the polymer blends of Examples II and IV, which differ from each other only in the composition of the butadiene-styrene interpolymer substrate of their graft copolymer component, emphasizes the importance of the swelling index of the butadiene-styrene interpolymer substrate of the graft copolymer. The polymer blend of Example IV, in which the rubber substrate of the graft copolymer component is a butadiene-styrene interpolymer which contains 50 parts of butadiene, 50 parts of styrene and 1 part of divinyl benzene and has a swelling index of about 11, has a materially smaller haze value than the polymer blend of Example II in which the rubbery substrate of the graft copolymer is a butadiene-styrene interpolymer which contains 50 parts of butadiene, 50 parts of styrene and no divinyl benzene and has a swelling index of about 25.

The tensile strength, modulus and impact strength of the polymer compositions of Examples I-V and control A are determined by standard ASTM test procedures and are set forth in Table III.

TABLE III

| Polymer composition | Tensile, p.s.i. | | Modulus, p.s.i.×10⁻⁵ | Impact strength at 20° C. notched, ft.lb./in.[1] |
|---|---|---|---|---|
| | At yield | At failure | | |
| Example I | 5,470 | 4,570 | 2.20 | 0.8 |
| Example II | 5,750 | 5,300 | 2.40 | 0.8 |
| Example III | 5,460 | 4,710 | 2.30 | 0.8 |
| Example IV | 5,800 | 4,900 | 2.40 | 0.7 |
| Example V | 5,720 | 4,980 | 2.40 | 0.7 |
| Control A | 3,470 | 3,450 | 1.80 | 0.8 |

[1] 1 x ½" bar, notch radius = 0.01".

It will be observed that all of the polymer compositions of the invention have higher tensile and modulus values than the control composition and comparable impact strengths.

All of the polymer blends reported in the subsequent examples are prepared by milling a mixture of a styrene-acrylonitrile graft copolymer and a styrene-acrylonitrile interpolymer for three minutes on a two roll rubber mill with the roll temperatures being set at 325° F. After milling, the polymer blends are extruded and ground to a fine powder. All of the reported physical properties are measured upon injection molded samples.

*Example VI*

A butadiene-styrene interpolymer is prepared from a monomer mixture consisting of 50 parts of butadiene, 50 parts of styrene and 0.75 part of divinyl benzene. The balance of the polymerization recipe and the process employed are identical with that described with respect to the preparation of butadiene-styrene interpolymer A. A sample of the butadiene-styrene interpolymer is recovered from the latex and has a swelling index of less than 25.

To the butadiene-styrene interpolymer latex prepared in the paragraph above are added 22 parts of water, 50 parts of a monomer mixture containing 72 weight percent of styrene and 28 weight percent of acrylonitrile, and potassium persulfate in the amount of 0.2 weight percent of the monomer mixture. The reaction mixture is heated to 70° C. and stirred until all of the styrene-acrylonitrile monomers are polymerized. The graft copolymer emulsion is cooled to room temperature under a nitrogen atmosphere and 1 part of a styrenated phenol antioxidant is added thereto. The graft copolymer is recovered by drum drying.

Six polymer blends are prepared by admixing the styrene-acrylonitrile graft copolymer from the paragraph above with an interpolymer of 72 weight percent of styrene and 28 weight percent of acrylonitrile which has a specific viscosity of 0.07 as determined in an 0.1 percent solution in dimethylformamide at 20° C. The proportions of the two polymers employed are such that the polymer blends contain respectively 10, 15, 20, 25, 30 and 35 weight percent of the butadiene-styrene interpolymer that is employed as the substrate in the graft copolymer. The physical properties of the polymer blends are set forth in Table IV.

TABLE IV

| Weight Percent BD-S[a] Interpolymer in blend | Impact strength at 20° C. ft.lb./in.[b] | Tensile at break p.s.i. | Percent elongation at break | Modulus ×10⁻⁵ p.s.i |
|---|---|---|---|---|
| 10 | 0.5 | 6,500 | 11 | 4.2 |
| 15 | 0.6 | 6,200 | 16 | 3.7 |
| 20 | 1.1 | 5,700 | 22 | 3.3 |
| 25 | 2.4 | 5,300 | 30 | 2.7 |
| 30 | 4.2 | 4,800 | 41 | 2.3 |
| 35 | 7.2 | 4,400 | 39 | 2.0 |

[a] BD-S=Butadiene-styrene.
[b] ½″ x ½″ bar, notch radius=0.01″

It is seen from the above table that the tensile strength and modulus values of the polymer blends fall off as the percent of the butadiene-styrene interpolymer substrate of the graft copolymer included in the polymer blend is increased. Conversely, the impact strength and elongation at break values increase as the percent of the butadiene-styrene interpolymer substrate of the graft copolymer included in the blend is increased.

*Example VII*

A series of graft copolymers are prepared by polymerizing, respectively, 20, 40, 50, 60, 80, 100, and 150 parts of a monomer mixture containing 72 weight percent of styrene and 28 weight percent of acrylonitrile in an aqueous dispersion containing 100 parts of the butadiene-styrene interpolymer that is described in Example VI. Except for the quantity of the styrene-acrylonitrile monomer mixture employed, the polymerization procedure employed in the preparation of the graft copolymers is identical with that described in Example VI. The graft copolymers are recovered by drum-drying.

Each of the graft copolymers described in the paragraph above is admixed with the interpolymer of 72 weight percent of styrene and 28 weight percent of acrylonitrile described in Example VI in such proportions that the butadiene-styrene interpolymer substrate of the graft copolymer constitutes 30 weight percent of the polymer blend. A control polymer blend is prepared by admixing 30 parts of the butadiene-styrene interpolymer employed as the substrate in the graft copolymers with 70 parts of the interpolymer of 72 weight percent of styrene and 28 weight percent of acrylonitrile. The physical properties of the resulting polymer blends are set forth in Table V.

TABLE V

| Parts S-AN[a] monomers grafted on BD-S[b] substrate | Impact strength at 20° C., ft. lbs./inch[c] | Tensile at break, p.s.i. | Percent elongation at break | Modulus ×10⁻⁵, p.s.i. |
|---|---|---|---|---|
| 0 | 0.4 | 4,800 | 7 | 2.6 |
| 20 | 3.3 | 4,700 | 51 | 2.5 |
| 40 | 7.0 | 4,800 | 43 | 2.5 |
| 50 | 4.2 | 4,800 | 41 | 2.3 |
| 60 | 3.1 | 4,800 | 38 | 2.5 |
| 80 | 2.4 | 4,800 | 34 | 2.3 |
| 100 | 1.7 | 5,200 | 30 | 2.4 |
| 150 | 1.0 | 5,600 | 28 | 2.5 |

[a] S-AN=Styrene-acrylonitrile.
[b] BD-S=Butadiene-styrene.
[c] ½″ x ½″ bar, notch radius=0.01″.

It is seen that the impact strength of the polymer blends is affected significantly by the quantity of the styrene-acrylonitrile monomer mixture grafted upon the butadiene-styrene interpolymer substrate of the graft copolymer. In particular, the impact strength of the blends reaches a maximum value when about 40 parts of the styrene-acrylonitrile monomer mixture are grafted upon the butadiene-styrene interpolymer substrate and falls off rapidly when the quantity of the styrene-acrylonitrile monomer mixture thus grafted is either decreased or increased. It is further observed that the elongation at break decreases as the quantity of the styrene-acrylonitrile monomer mixture grafted upon the butadiene-styrene interpolymer substrate is increased. When more than 80 parts of the styrene-acrylonitrile monomer mixture are grafted upon 100 parts of the butadiene-styrene interpolymer substrate, the tensile strength of the blends is increased.

It is also observed that the clarity of the polymer blends increases as the quantity of styrene-acrylonitrile monomers grafted upon the butadiene-styrene interpolymer substrate is increased.

*Example VIII*

A series of butadiene-styrene interpolymers is prepared by polymerizing monomer mixtures containing 50 parts of butadiene, 50 parts of styrene and, respectively, 0, 0.25, 0.75, 1.0, 1.25 and 1.5 parts of divinyl benzene. Except for the composition of the monomer charge, the polymerization process employed is identical with that set forth in Example VI.

A series of graft copolymers is prepared by polymerizing 40 parts of a monomer mixture containing 72 weight percent of styrene and 28 weight percent of acrylonitrile in aqueous dispersions containing 100 parts of each of the butadiene-styrene interpolymers prepared in the paragraph above. The graft copolymerization procedure employed is otherwise identical with that described in Example VI. One part of a styrenated phenol antioxidant is incorporated into each of the latexes and the graph copolymers are recovered by spray drying.

Each of the graft copolymers prepared above is admixed with the interpolymer of 72 weight percent of styrene and 28 weight percent of acrylonitrile described in Example VI in such proportions that the butadiene-styrene interpolymer substrate of the graft copolymer constitutes 30 weight percent of the resultant blends. The impact strengths of the blends are set forth in Table VI.

TABLE VI

| Parts DVB[a]/100 parts of BD[b] and S[c] in BD–S interpolymer: | Impact strength at 20° C., ft. lbs./in.[d] |
|---|---|
| 0 | 10.1 |
| 0.25 | 10.4 |
| 0.75 | 5.1 |
| 1.0 | 2.9 |
| 1.25 | 2.0 |
| 1.5 | 0.4 |

[a] DVB=Divinyl benzene.
[b] BD=Butadiene.
[c] S=Styrene.
[d] ½″ x ½″ bar, notch radius=0.01″.

As seen from the above table, the impact strength of blends falls off rapidly as the quantity of divinyl benzene included in the butadiene-styrene interpolymer substrate of the graft copolymer is increased. This adverse effect is offset in part by the fact that the clarity and surface properties (i.e., gloss and smoothness) of the injection molded specimens are improved as the quantity of divinyl benzene included in the butadiene-styrene interpolymer is increased.

*Example IX*

A latex of a butadiene-styrene interpolymer containing 50 parts of butadiene, 50 parts of styrene and 0.75 part of divinyl benzene is prepared by the procedure of Example VI. Three additional latexes of the same butadiene-styrene interpolymer are prepared by an identical procedure except that the 5 parts of sodium stearate emulsifier are replaced with, respectively, 3, 10 and 15 parts of sodium stearate.

Four graft copolymers are prepared by polymerizing 40 parts of a monomer mixture consisting of 72 weight percent of styrene and 28 weight percent of acrylonitrile in aqueous dispersions containing 100 parts of each of the butadiene-styrene interpolymers prepared in the paragraph above. The graft copolymerization procedure employed is otherwise identical with that described in Example VI. One part of a styrenated phenol antioxidant is incorporated into each of the latexes and the graft copolymers are recovered by spray drying.

Each of the graft copolymers prepared in paragraph above is admixed with the interpolymer of 72 weight percent of styrene and 28 weight percent of acrylonitrile described in Example VI in such proportions that the butadiene-styrene interpolymer substrate of the graft copolymer constitutes 30 weight percent of the resultant blends. The physical properties of these blends are set forth in Table VII.

TABLE VII

| Parts emulsifier used in preparation of graft copolymer | Impact strength at 20° C., ft. lbs./in.[a] | Tensile at break, p.s.i. | Percent elongation at break | Modulus ×10⁻⁵, p.s.i. |
| --- | --- | --- | --- | --- |
| 3 | 7.5 | 4,800 | 40 | 2.4 |
| 5 | 5.1 | 4,700 | 44 | 2.3 |
| 10 | 4.6 | 4,600 | 54 | 2.3 |
| 15 | 2.7 | 4,400 | 50 | 2.2 |

[a] ½″ × ½″ bar, notch radius=0.01″.

It will be noted that the impact strength of the blends increases markedly as the quantity of the emulsifier employed in the preparation of the butadiene-styrene interpolymer substrate of the graft copolymer is decreased. A small increase in tensile strength and a small decrease in the elongation at break is noted as the quantity of emulsifier is decreased. The clarity of the blends also improves as the quantity of emulsifier is decreased.

*Example X*

PART A

A graft copolymer is prepared by polymerizing 50 parts of a monomer mixture containing 85 weight percent of styrene and 15 weight percent of acrylonitrile in an aqueous dispersion containing 100 parts of the butadiene-styrene interpolymer that is described in Example VI. Except for the composition of the styrene-acrylonitrile monomer mixture employed, the polymerization procedure employed in the preparation of the graft copolymer is identical with that described in Example VI. The graft copolymer is recovered by drum-drying.

The graft copolymer described in the paragraph above is admixed with an interpolymer of 85 weight percent of styrene and 15 weight percent of acrylonitrile which has a specific viscosity of about 0.08 as determined in an 0.1% solution in dimethylformamide at 20° C. in such proportions that the butadiene-styrene interpolymer substrate of the graft copolymer constitutes 30 weight percent of the polymer blend. The resulting polymer blend is transparent and has an impact strength of more than 4 ft. lbs./in. at 20° C.

PART B

Part A is repeated except that the styrene-acrylonitrile interpolymer that is admixed with the graft copolymer is the styrene-acrylonitrile interpolymer described in Example VI. Comparable results are obtained.

*Example XI*

A graft copolymer is prepared by polymerizing 50 parts of a monomer mixture containing 60 weight percent of styrene and 40 weight percent acrylonitrile in an aqueous dispersion containing 100 parts of the butadiene-styrene interpolymer that is described in Example VI. Except for the composition of the styrene-acrylonitrile monomer mixture employed, the polymerization procedure employed in the preparation of the graft copolymer is identical with that described in Example VI. The graft copolymer is recovered by drum-drying.

The graft copolymer described in the paragraph above is admixed with an interpolymer of 60 weight percent of styrene and 40 weight percent of acrylonitrile which has a specific viscosity of about 0.07 as determined in an 0.1% solution in dimethylformamide at 20° C. in such proportions that the butadiene-styrene interpolymer substrate of the graft copolymer constitutes 30 weight percent of the polymer blend. The resulting polymer blend is transparent and has an impact strength of more than 4 ft. lbs./in. at 20° C.

The graft copolymers of this invention are prepared by polymerizing a monomer mixture consisting of 60–90 and preferably 65–80 weight percent of styrene and, correspondingly, 40–10 and preferably 35–20 weight percent of acrylonitrile in any aqueous dispersion of a highly cross-linked rubbery interpolymer of butadiene and styrene.

The two parameters which characterize the butadiene-styrene interpolymer employed in the preparation of the graft copolymer are:

(1) The swelling index of the interpolymer (which characterizes its degree of cross-linking), and (2) The proportions of butadiene and styrene contained in the interpolymer.

The butadiene-styrene interpolymer employed must be more highly cross-linked than the conventional butadiene-styrene interpolymers that are commercially available to the art. The degree of cross-linking is measured quantitatively by the swelling index of the interpolymer in benzene as determined by the test procedure set forth earlier herein. To be operable in the present invention, the butadiene-styrene interpolymer should have a swelling index of not greater than about 25 and preferably not greater than about 15.

In the broadest embodiment of the invention the butadiene-styrene interpolymer employed in the preparation of the graft copolymer can contain 25–60 weight percent of styrene and the balance butadiene or a mixture of butadiene and a cross-linking monomer, i.e., a monomer containing a plurality of non-conjugated terminal ethylenic groups. Where the utmost of optical clarity and minimum of haze are required in the graft copolymer (or in blends thereof with styrene-acrylontrile interpolymers), the butadiene-styrene interpolymer employed in the preparation thereof should contain 45–60 weight percent of styrene and the balance butadiene or a mixture of butadiene and a cross-linking monomer. As was set forth in certain of the examples, the inclusion of minor amounts of a cross-linking monomer in the butadiene-styrene interpolymers reduces the swelling index thereof and improves the optical clarity of the graft copolymers prepared therefrom. In addition, the inclusion of a cross-linking monomer in the butadiene-styrene interpolymer improves the surface properties of articles fabricated from the resulting graft copolymers. These desirable effects are offset in part by the fact that the inclusion of a cross-linking monomer in the butadiene-styrene interpolymer substrate adversely affects the impact strength of the resulting graft copolymer. This effect is particularly noticeable in blends of the graft copolymers with styrene-acrylonitrile interpolymers. Accordingly, the maximum quantity of cross-linking monomer included in the butadiene-styrene interpolymer should not exceed 1.5 weight percent or preferably 1.0 weight percent. From a consideration of many factors, it is preferred to include a cross-linking monomer in the butadiene-styrene interpolymer in the amount of about 0.2–0.9 weight percent. Suitable cross-linking monomers for incorporation in the butadiene-styrene interpolymers include divinyl benzene, allyl acrylate, allyl methacrylate, diallyl maleate, diallyl fumarate, diallyl adipate, diallyl phthalate and diacrylate and dimethacrylate esters of polyhydric alcohols, e.g., the diacrylate ester of ethylene glycol. Scores of other suitable cross-linking monomers of diverse chemical types are commercially available from suppliers of specialty monomers.

The aqueous dispersions of the butadiene-styrene interpolymers employed in the preparation of the graft copolymers can be prepared by employing conventional emulsion polymerization recipes. Such polymerizations, however, are carried out under conditions which assure that the butadiene-styrene interpolymer will be sufficiently highly cross-linked to have the required swelling index. In general, the butadiene-styrene interpolymers are cross-linked by including a small quantity of a cross-linking monomer in the butadiene-styrene monomer mixture or by polymerizing the butadiene-styrene monomer mixture to a conversion of greater than 90% or both.

In general, 100 parts of the butadiene-styrene monomer mixture are emulsified in at least 100 parts (preferably 150–300 parts) of water with the aid of micelle-forming emulsifying agents which are usually compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like. Exemplary emulsifying agents include sodium oleate, sodium stearate, the sodium salts of sulfate half esters of fatty alcohols produced by reduction of the fatty acids of natural oils such as coconut oil, sodium abietate, sodium salts of sulfosuccinic esters such as sodium dioctyl sulfosuccinate, sodium salts of alkylated benzene and naphthalene sulfonates such as sodium dodecyl benzene sulfonate, sodium salts of monosulfated fatty monoglycerides and the like. Such emulsifying agents will normally be employed in the ratio of about 2–15 and preferably 2–4 parts per 100 parts of monomers. For reasons which are not clearly understood, the physical and optical properties of the graft copolymers and blends thereof with styrene-acrylonitrile interpolymers are enhanced by employing the minimum feasible quantity of emulsifying agent in the preparation of the butadiene-styrene interpolymer. The polymerization medium will contain a suitable water-soluble, free radical generating polymerization initiator such as hydrogen peroxide, potassium or sodium persulfates, perborates, peracetates, percarbonates and the like, which polymerization initiators may be associated with activating systems such as redox systems involving versivalent metals and mild reducing agents. Generally the polymerization medium also will contain a chain-transfer agent such as a higher alkyl mercaptan of the order of dodecyl mercaptan, which both moderates the molecular weights of the butadiene-styrene interpolymers and also assists in initiating the action of the polymerization initiator in the polymerization. The polymerizations may be carried out at temperatures from about 40° C. to about 80° C. or, in the case of activated systems, of a range including lower temperatures such as 0° C. to 80° C.

The graft copolymers are prepared by polymerizing 10–900 parts of the styrene-acrylonitrile monomer mixture in an aqueous dispersion containing 100 parts of the butadiene-styrene interpolymer. Where the graft copolymers are to be employed as the sole polymer in the manufacture of molded and extruded articles, the graft copolymers are preferably prepared by polymerizing 150–900 or more especially 200–400 parts of the styrene-acrylonitrile monomer mixture in an aqueous dispersion containing 100 parts of the butadiene-styrene interpolymer. Where the graft copolymers are to be employed in the preparation of polymer blends with styrene-acrylonitrile interpolymers, the graft copolymers are prepared by polymerizing 10–125 and preferably 20–80 or more especially 40–60 parts of the styrene-acrylonitrile monomer mixture in an aqueous dispersion containing 100 parts of the butadiene-styrene interpolymer.

In preparing the graft copolymers, the mixture of styrene and acrylonitrile monomers is added to the aqueous dispersion of the butadiene-styrene interpolymer and the resulting mixture is agitated and heated to a temperature, e.g., 40–100° C., at which the polymerization initiator present in the system initiates the polymerization of the added monomers. If desired, fresh polymeriaztion initator can be added to the polymerization system with the styrene-acrylonitrile monomer mixture although this addition is usually not required. In most cases, the residual polymerization initiator employed in the polymerization of the butadiene-styrene interpolymer and/or the radicals present on the rubbery polymer chains are sufficient to initiate the polymerization of the added monomers. It is preferred not to add emulsifying agents to the polymerization system and by carrying out the polymerization in this manner essentially all of the added styrene-acrylonitrile monomers become dispersed in the previously formed rubbery polymer particles and the efficiency of the grafting reaction is very high.

The graft copolymers can be recovered from the aqueous dispersions in which they are prepared by conventional means such as coagulating, freezing, or drum-drying. The graft copolymers vary in physical nature from stiff rubbers to hard resins.

A prime utility of the graft copolymers lies in the preparation of polymer blends with rigid styrene-acrylonitrile interpolymers containing 60–90 and preferably 65–80 weight percent of styrene and, correspondingly, 40–10 and preferably 35–20 weight percent of acrylonitrile. The graft copolymer and the styrene-acrylonitrile interpolymer are combined in such proportions that the butadiene-styrene interpolymer substrate of the graft copolymer constitutes 5–40 and preferably 20–35 weight percent of the resultant polymer blend.

The styrene-acrylonitrile interpolymers included in such polymer blends can be prepared by mass, solution or emulsion polymerization techniques according to methods well-known in the art, e.g., see "Styrene, Its Polymers, Copolymers and Derivatives," by Boundy and Boyer, Reinhold Publishing Company, Waverley Press, Baltimore, Maryland. For the development of optimum properties, the styrene-acrylonitrile interpolymers should have a specific viscosity of at least about 0.05 as measured in an 0.1% solution in dimethylformamide at 20° C. In the preferred polymer blends of the invention, the weight ratio of the styrene and acrylonitrile contained in the styrene-acrylonitrile interpolymer will be substantially identical with the weight ratio of the styrene and acrylonitrile employed in the preparation of the graft copolymer.

The polymer blends can be prepared by blending latexes of the graft copolymer and the rigid styrene-acrylonitrile interpolymer and recovering the polymers from the mixed latexes. Alternatively, they can be prepared by simply comalaxating a mixture of the rigid styrene-acrylonitrile interpolymer and the graft copolymer at an elevated temperature for a period of time sufficient to prepare an intimate fusion blend of the two polymers. Such comalaxation can be carried out on rubber mills, in Banbury mixers, in screw extruders and in other types of conventional plastics working equipment.

The graft copolymers per se and blends of the graft copolymers with styrene-acrylonitrile interpolymers can be employed in the manufacture of high strength injection moldings, in the manufacture of extruded sheets and films and for the manufacture of other high strength articles by methods well-known in the art.

If desired, stabilizers, antioxidants, plasticizers, lubricants, colorants and other conventional additives may be included in the graft copolymers and the blends thereof with styrene acrylonitrile interploymers.

In the above specification and appended claims the term graft copolymer is used in the restricted sense of denoting the copolymer that is prepared by polymerizing the sytrene-acrylonitrile monomer mixture in an aqueous dispersion of the butadiene-styrene interpolymer. The butadiene-styrene interpolymer is referred to as the substrate and the polymerized styrene-acrylonitrile monomer mixture is referred to as the superstrate.

The above descriptions and particularly the examples are set forth by way of illustration only. Many other modifications and variations of the invention will be apparent to those skilled in the art and may be employed without departing from the spirit and scope of the invention herein described.

This application is a continuation-in-part of my copending application, S.N. 599,939, filed on July 25, 1956, now abandoned.

What is claimed is:

1. A composition comprising as its sole polymeric components an intimate physical admixture of (1) a styrene-acrylonitrile superstrate/diene rubber substrate graft copolymer and (2) a separately-prepared copolymer of 60–90% by weight of styrene and, correspondingly, 40–10% by weight of acrylonitrile in such proportion that the diene rubber substrate of the graft copolymer constitutes 5–40% by weight of the admixture; said graft copolymer being the product obtained by polymerizing 10–900 parts by weight of a mixture consisting of 60–90% by weight of styrene and 40–10% by weight of acrylonitrile in an aqueous dispersion containing 100 parts by weight of a rubbery interpolymer consisting of 38.5–75% by weight of combined butadiene, 25–60% by weight of combined styrene, and up to 1.5% by weight of a combined cross-linking monomer containing a plurality of non-conjugated, non-cumulative terminal ethylenic groups; said rubbery interpolymer having a swelling index not greater than about 25 in benzene.

2. A composition as in claim 1 wherein the rubbery interpolymer substrate of the graft copolymer consists of 39.1–74.8% by weight of combined butadiene, 25–60% by weight of combined styrene, and 0.2–0.9% by weight of the combined cross-linking monomer.

3. A composition as in claim 1 wherein the rubbery interpolymer substrate of the graft copolymer consists of 38.5–55% by weight of combined butadiene, 45–60% by weight of combined styrene, and up to 1.5% by weight of the combined cross-linking monomer.

4. A composition as in claim 1 wherein the rubbery interpolymer substrate of the graft copolymer consists of 39.1–54.8% by weight of combined butadiene, 45–60% by weight of combined styrene, and 0.2–0.9% by weight of the combined cross-linking monomer.

5. A composition comprising as its sole polymeric components an intimate physical admixture of (1) a styrene-acrylonitrile superstrate/diene rubber substrate graft copolymer and (2) a separately-prepared copolymer of 60–90% by weight of styrene and, correspondingly, 40–10% by weight of acrylonitrile in such proportions that the diene rubber substrate of the graft copolymer constitutes 20–35% by weight of the admixture; said graft copolymer being the product obtained by polymerizing 10–125 parts by weight of a mixture consisting of 60–90% by weight of styrene and 40–10% by weight of acrylonitrile in an aqueous dispersion containing 100 parts by weight of a rubbery interpolymer consisting of 38.5–75% by weight of combined butadiene, 25–60% by weight of combined styrene, and up to 1.5% by weight of a combined cross-linking monomer containing a plurality of non-conjugated, no-cumulative terminal ethylenic groups; said rubber interpolymer having a swelling index not greater than about 25 in benzene 6. A composition comprising as its sole polymeric components an intimate physical admixture of (1) a styrene-acrylonitrile superstrate/diene rubber substrate graft copolymer and (2) a separately-prepared copolymer of 65–80% by weight of styrene and, correspondingly, 35–20% by weight of acrylonitrile in such proportions that the diene rubber substrate of the graft copolymer constitutes 20–35% by weight of the admixture; said graft copolymer being the product obtained by polymerizing 20–80 parts by weight of a mixture consisting of 65–80% by weight of styrene and 35–20% by weight of carylonitrile in an aqueous dispersion containing 100 parts by weight of a rubbery interpolymer consisting of 38.5–55% by weight of combined butadiene, 45–60% by weight of combined styrene, and up to 1.5% by weight of a combined cross-linking monomer containing a plurality of non-conjugated, non-cumulative terminal ethylenic groups; said rubbery interpolymer having a swelling index not greater than about 25 in benzene.

7. A composition as in claim 6 wherein the rubbery interpolymer substrate of the graft copolymer consists of 39.1–54.8% by weight of combined butadiene, 45–60% by weight of combined styrene, and 0.2–0.9% by weight of the combined cross-linking monomer.

References Cited in the file of this patent
UNITED STATES PATENTS

| | | |
|---|---|---|
| 2,802,808 | Hayes | Aug. 13, 1957 |
| 2,802,809 | Hayes | Aug. 13, 1957 |

FOREIGN PATENTS

| | | |
|---|---|---|
| 649,166 | Great Britain | Jan. 17, 1951 |

OTHER REFERENCES

Whitby: "Synthetic Rubber," page 338, published by Wiley, New York (1954).

Hart: "Industrie Chimique Belge," 21, 1051 (page 1057 relied upon) (1956).